United States Patent
Lewis et al.

(10) Patent No.: US 11,572,474 B2
(45) Date of Patent: *Feb. 7, 2023

(54) COMPOSITIONS COMPRISING LIGNOCELLULOSIC BYPRODUCTS FOR TIRE BALLASTS AND ASSOCIATED METHODS

(71) Applicant: Sustainable Fiber Technologies, LLC, Renton, WA (US)

(72) Inventors: Mark Lewis, Renton, WA (US); Sabrina Burkhardt, Renton, WA (US); Jessica Lewis, Renton, WA (US)

(73) Assignee: Sustainable Fiber Technologies, LLC, Renton, WA (US)

( * ) Notice: Subject to any disclaimer, the term of this patent is extended or adjusted under 35 U.S.C. 154(b) by 438 days.

This patent is subject to a terminal disclaimer.

(21) Appl. No.: 16/881,973

(22) Filed: May 22, 2020

(65) Prior Publication Data

US 2021/0363352 A1    Nov. 25, 2021

(51) Int. Cl.
*C08L 97/00* (2006.01)
*B60C 5/00* (2006.01)

(52) U.S. Cl.
CPC ............ *C08L 97/005* (2013.01); *B60C 5/005* (2013.01)

(58) Field of Classification Search
None
See application file for complete search history.

(56) References Cited

U.S. PATENT DOCUMENTS

| | | | |
|---|---|---|---|
| 2,592,983 | A | 4/1952 | Von Hilderbrandt |
| 4,372,811 | A | 2/1983 | Samuelson et al. |
| 4,698,225 | A | 10/1987 | Morrison |
| 4,728,393 | A | 3/1988 | Peel |
| 4,746,449 | A | 5/1988 | Peel |
| 4,786,438 | A | 11/1988 | Blackmore |
| 4,824,588 | A | 4/1989 | Lin |
| 4,871,825 | A | 10/1989 | Lin |
| 4,952,415 | A | 8/1990 | Winowiski et al. |
| 4,988,520 | A | 1/1991 | Overton |
| 4,996,065 | A | 2/1991 | Van de Walle |
| 5,010,156 | A | 4/1991 | Cook |
| 5,281,434 | A | 1/1994 | Winowiski et al. |
| 5,312,632 | A | 5/1994 | Simsa et al. |
| 5,595,628 | A | 1/1997 | Gordon et al. |
| 5,639,319 | A * | 6/1997 | Daly ................ B60C 5/004 141/38 |
| 5,786,007 | A | 1/1998 | Webb |
| 5,714,184 | A | 2/1998 | Major |
| 6,013,116 | A | 1/2000 | Major et al. |
| 6,113,974 | A | 9/2000 | Winowiski et al. |
| 6,464,827 | B1 | 10/2002 | Colodette |
| 6,506,318 | B1 | 1/2003 | Sapienza et al. |
| 6,605,232 | B1 | 8/2003 | Montgomery et al. |
| 7,070,709 | B2 | 7/2006 | Schilling |
| 7,514,018 | B2 | 4/2009 | Schilling |
| 8,268,121 | B2 | 9/2012 | Blount |
| 8,574,631 | B2 | 11/2013 | Anderson |
| 9,133,378 | B2 | 9/2015 | Maslow |
| 2003/0156970 | A1 | 8/2003 | Oberkofler et al. |
| 2005/0247907 | A1 | 11/2005 | Sapienza et al. |
| 2005/0277712 | A1 * | 12/2005 | Daly ................ B29C 73/22 156/75 |
| 2006/0202156 | A1 | 9/2006 | Sapienza et al. |
| 2008/0121356 | A1 | 5/2008 | Griffith |
| 2009/0314983 | A1 | 12/2009 | Sapienza et al. |
| 2011/0003352 | A1 | 1/2011 | Retsina |
| 2012/0108798 | A1 | 5/2012 | Wenger et al. |
| 2012/0301598 | A1 | 11/2012 | Karges et al. |
| 2013/0175467 | A1 | 7/2013 | Bradt et al. |
| 2013/0217868 | A1 | 8/2013 | Fackler et al. |
| 2014/0249271 | A1 | 9/2014 | Pietarinen |
| 2014/0288285 | A1 | 9/2014 | Tiers |
| 2014/0315254 | A1 | 10/2014 | Gao |
| 2014/0316162 | A1 | 10/2014 | Gao |
| 2014/0329999 | A1 | 11/2014 | Friedl |
| 2015/0122429 | A1 | 5/2015 | Dybov |
| 2015/0203774 | A1 | 7/2015 | Lake |
| 2016/0229880 | A1 | 8/2016 | Pietarinen |

(Continued)

FOREIGN PATENT DOCUMENTS

| | | |
|---|---|---|
| CA | 2434215 | 1/2004 |
| CA | 2760840 | 3/2011 |

(Continued)

OTHER PUBLICATIONS

Sun, Run-Cang and Lawther, J. Mark. "Isolation and Characterization of Organosolv Lignins from Wheat Straw". School of Agricultural and Firest Sciences University of Wales, Bangor, Gwynedd, UK, Wood and Fiber Science, 30(1) 1998 pp. 56-63, 1998 Society of Wood Science and Technology.

Lora, J. H. "Lignin Properties and Materials", "Chapter 23—Characteristics and Potential Applications of Lignin Produced by an Organosolv Pulping Process", 1989 American Chemical Society, pp. 312-323.

Nitsos, Christos, "Organosolv Fractionation of Softwood Biomass for Biofuel and Biorefinery Applications", Energies MDPI, Published Dec. 27, 2017.

Pan et al. (Biotechnology and Bioengineering, vol. 94, No. 5, Aug. 5, 2006, p. 851-861) (Year: 2006).

(Continued)

*Primary Examiner* — Nghi V Nguyen
(74) *Attorney, Agent, or Firm* — Emerson, Thomson & Bennett, LLC; Roger D. Emerson; Peter R. Detorre

(57) ABSTRACT

Provided is a solvent borne tire ballast composition which includes in a solvent, a low molecular weight lignin in an amount of at least 5 weight % (or optionally, 10 or 15 or 20 weight %) to 30 or 40 or 50 weight % of the solids, and hemicellulose in an amount of at least 0.1 weight % (or optionally, 0.2 or 0.5 or 1.0 or 2.0 or 5.0 weight %) to 20 weight % (or 10 or 15 or 18 or 25 or 30 weight %) of the solids.

11 Claims, 2 Drawing Sheets

(56) References Cited

U.S. PATENT DOCUMENTS

| | | |
|---|---|---|
| 2016/0237194 A1 | 8/2016 | Pietarinen |
| 2016/0257791 A1 | 9/2016 | Pietarinen |
| 2017/0226330 A1 | 8/2017 | Knudsen |
| 2018/0002451 A1 | 1/2018 | Ge |
| 2019/0062508 A1 | 2/2019 | Winsness |
| 2019/0091643 A1 | 3/2019 | Lewis |
| 2019/0153280 A1 | 5/2019 | Lewis |

FOREIGN PATENT DOCUMENTS

| | | |
|---|---|---|
| CA | 2936029 | 7/2015 |
| CN | 1042743 | 6/1990 |
| CN | 1438385 | 8/2003 |
| CN | 102746052 | 10/2012 |
| CN | 102704296 | 6/2014 |
| CN | 104628482 | 2/2015 |
| CN | 105130682 | 12/2015 |
| CN | 106495847 | 3/2017 |
| CN | 107382500 | 11/2017 |
| CN | 107417428 | 12/2017 |
| CN | 208792052 | 4/2019 |
| DE | 102009051884 | 5/2011 |
| EP | 2831088 | 2/2018 |
| FR | 2673941 | 9/1992 |
| WO | 2002037981 | 5/2002 |
| WO | 20120137204 | 10/2012 |
| WO | 20140124401 | 8/2014 |
| WO | 2015023580 | 2/2015 |
| WO | 2015104296 | 7/2015 |

OTHER PUBLICATIONS

Lindner, Albert and Wegener, Gerd, Characterization of Lignins from Organosolv Pulping According to the Organocell Process Part 1. Elemental Analysis, Nonlignin Portions and Functional Groups, Journal of Wood Chemistry and Technology, vol. 8, 1988—Issue 3, 323-340, 1988.

Lawther, J. Mark; Sun, Run-Cang & Banks, W.B., Isolation and Characterization of Organosolv Lignin under Alkaline Condition from Wheat Straw. International Journal of Polymer Analysis and Characterization vol. 3, 1997, published online Sep. 24, 2006.

Lindner, Albert & Wegener, Gerd. "Characterization of Lignins from Organosolv Pulping According to the Organocell Process part 1. Elemental Analysis, Nonlignin Portions and Functional Groups", Journal of Wood Chemistry and Technology vol. 8, 1988—Issue 3, pp. 323-340, Published Online https://doi.org/10.1080/02773818808070688 Dec. 13, 2006.

Lora, Jairo. "Monomers, Polymers and Composites from Renewable Resources", "Chapter 10—Industrial Commercial Lignins: Sources, Properties and Applications" 2008, pp. 225-241.

International Search Report and Written Opinion for PCT App. No. PCT/US2020/039844 dated Oct. 22, 2020.

International Search Report and Written Opinion for PCT App. No. PCT/US2020/039858 dated Oct. 21, 2020.

* cited by examiner

COMPOSITIONS COMPRISING LIGNOCELLULOSIC BYPRODUCTS FOR TIRE BALLASTS AND ASSOCIATED METHODS

BACKGROUND

A. Field

Compositions comprising lignocellulosic byproducts can serve useful purposes in colder temperatures. One purpose discovered include the application of such compositions for use as tire ballasts. Accordingly, the present disclosure relates generally to tire ballast compositions comprising, lignin and sugar byproducts of cellulose production, a solvent and optionally, an organic compound such as glycerin or glycol additives.

B. Description of the Related Art

Tire ballasting, is a process of adding weight to the tires of vehicles. Tire ballasts are typically used in tractors and many other types of agricultural and construction equipment to improve weight distribution across the vehicle, to improve traction and to improve the transfer of power to the ground. Commonly used materials for tire ballasting include rocks, soil, cast iron, water, calcium chloride, magnesium chloride, beet juice, etc. Other common tire ballast materials set forth in U.S. Pat. No. 5,639,319 include barytes (barium sulphate) water and cornstarch; baryte, water and cornstarch; carboxy methyl cellulose, water and barytes (for use in warmer non-freeze climates); barytes, calcium chloride, fuller's earth and water; iron oxide pigment, calcium chloride, fuller's earth and water; barytes, bentonite and water; calcium chloride, water, cornstarch; and water and high velocity animal glue. Of these materials, it is common to inject a liquid tire blast typically comprising a solution of calcium chloride, magnesium chloride or beet juice into the tire. These materials, however, have several disadvantages. First, chloride solutions can have a corrosive effect on the both the wheel and the environment. In fact, if a chloride brine is used as a tire ballast, the tire would need to be lined with a tube to prevent the chloride brine from directly corroding the rim. Many farmers and other individuals, however, prefer to use tubeless tires due to their ease of use. Moreover, the protection offered by tubes to prevent the chloride brine from contacting the rim is limited as tubes as chloride brines are capable of corroding rims regardless of the use of tubes and as tubes are known to leak. One solution to the use of a chloride brine as a tire ballast has been the use of beet juice. Also, although beet juice is comparable in performance to chloride solutions such as calcium chloride, it has a high sugar content and therefore, a high biological oxygen demand which can cause greater amounts of pollution in soil and waterways after the beet juice has served its purpose as a tire ballast and is disposed of. Therefore, what is needed in the art is a tire ballast composition which is organic in nature, non-corrosive and environmentally safe and biodegradable without depleting oxygen levels within soil and waterways, and which has a low freezing point to allow for operation of the vehicle in cold temperatures and a high specific gravity thereby providing similar performance to other tire ballast products.

SUMMARY

Provided is a solvent borne tire ballast composition. The tire ballast composition does not include any inorganic salts and distinguishes itself from other tire ballast compositions in that it does not include a blend of any type of chloride brine.

According to one embodiment, the solvent borne tire ballast composition includes a solvent, lignin, and sugar compound. The tire ballast composition includes a solvent borne blend of solids. The solids include: 1) lignin in an amount of 5 weight % (or optionally, 10 or 15 or 20 weight %) to 30 or 40 or 50 weight % solids, and 2) a sugar compound in an amount of 0.1 weight % (or optionally 0.2 or 0.5 or 1.0 or 2.0 or 5.0 weight %) to 20 weight % (or optionally, 10 or 15 or 18 or 25 or 30 weight %) solids, wherein at least 90 weight % (or optionally, 95 or 97 or 98 or 99 weight %) of the sugar compound is derived from hemicellulose, and 3) a solvent. The solvent includes water which may comprise from about 45 or 45 to about 70 or 70 wt. % of the composition and in certain embodiments may comprise from about 55 or 55 to about 60 or 60 wt. % of the composition. The tire ballast composition has a pH in the range of 7.0 to 10. The lignin and sugar compound include less than 0.5 weight % (or optionally, 0.2 weight %, or 0.1 weight % or 500 ppm) of sulfur. The tire ballast composition is substantially free of anthraquinone (anthracenedione).

According to another embodiment of the tire ballast composition, the lignin and sugar compound includes no sulfur.

According to another embodiment of the tire ballast composition, the lignin includes less than 3500 Da average molecular weight (or optionally, 2500 or 1500 Da).

According to another embodiment of the tire ballast composition, the solids are substantially free of monosaccharides in that the solids include no monosaccharides or monosaccharides in an amount of less than 0.1 weight % (or optionally, 0.2 or 0.5 or 1.0 or 2.0 weight %) solids.

According to another embodiment of the tire ballast composition, substantially all of the hemicellulose is derived from a non-wood source.

According to another embodiment of the tire ballast composition, substantially all of the lignin is derived from a non-wood source.

According to another embodiment of the tire ballast composition, the non-wood source of lignin and hemicellulose is selected from the group consisting of wheat straw, rice straw, barley straw, oat straw, rye grass, coastal Bermuda grass, *Arundo donax, miscanthus*, bamboo, sorghum, banana harvest residue, pineapple residue, sugarcane bagasse, industrial hemp, recreational *cannabis* waste, nut shell residue, kenaf, switchgrass, succulents, alfalfa, corn stover, and, flax straw.

According to another embodiment of the tire ballast composition, the lignin includes less than 0.01 weight % sulfonic groups or no sulfonic groups.

According to another embodiment of the tire ballast composition, the tire ballast composition includes no anthraquinone.

According to another embodiment of the tire ballast composition, the solvent of tire ballast composition includes one or more of ethylene glycol, propylene glycol, and glycerin.

According to another embodiment of the tire ballast composition, the solvent includes ethylene glycol and glycerin.

According to another embodiment of the tire ballast composition, the amount of glycerin is from about 5 wt. % to about 50 wt. % and wherein the amount of polyethylene glycol is from greater than 0 to about 30 wt. %.

According to another embodiment of the tire ballast composition, the amount of glycerin is about 0.5 wt. %.

Also provided is a method of making a tire ballast composition. The method includes providing and/or mixing a blend of solids and a solvent. The solids include: 11) lignin in an amount of 10 weight % (or optionally, 15 or 20 or 30 or 40 weight %) to 50 or 60 or 70 weight % solids wherein the lignin comprises less than 3500 Da average molecular weight (or 2500 or 1500 Da); and, 2) a sugar compound in an amount of 0.1 weight % (or optionally, 0.2 or 0.5 or 1.0 or 2.0 or 5.0 weight %) to 20 weight % (or optionally, 10 or 15 or 18 or 25 or 30 weight %) solids, wherein at least 90 weight % (or optionally, 95 or 97 or 98 or 99 weight %) of the sugar compound is derived from hemicellulose; and 3) a solvent. The solvent includes water which may comprise from about 45 or 45 to about 70 or 70 wt. % of the composition and in certain embodiments may comprise from about 55 or 55 to about 60 or 60 wt. % of the composition. The tire ballast composition has a pH in the range of 7.0 to 10. The lignin and sugar compound include less than 0.5 weight % (or optionally, 0.2 weight %, or 0.1 weight % or 500 ppm) of sulfur. The tire ballast composition is substantially free of anthraquinone (anthracenedione).

Also provided is a method of using a composition as a tire ballast. The method includes the following steps: mixing a blend of solids and a solvent, wherein the solids comprise: (i) lignin in an amount of 10 weight % (or optionally, 15 or 20 or 30 or 40 weight %) to 50 or 60 or 70 weight % solids wherein the lignin comprises less than 3500 Da average molecular weight (or 2500 or 1500 Da), and (ii) a sugar compound in an amount of 0.1 weight % (or optionally, 0.2 or 0.5 or 1.0 or 2.0 or 5.0 weight %) to 20 weight % (or optionally, 10 or 15 or 18 or 25 or 30 weight %) solids, wherein at least 90 weight % (or optionally, 95 or 97 or 98 or 99 weight %) of the sugar compound is derived from hemicellulose, a solvent, wherein the solvent comprises water, and wherein the tire ballast composition is substantially free of anthraquinone; providing a tire; injecting the tire ballast composition into the tire.

According to another embodiment of the tire ballast composition, the tire ballast composition is neutral to alkaline.

According to another embodiment of the tire ballast composition, the tire ballast composition has a pH in the range of about 7.0 to about 10.0.

According to another embodiment of the tire ballast composition, substantially all of the hemicellulose is derived from a non-wood source.

According to another embodiment of the tire ballast composition, substantially all of the lignin is derived from a non-wood source.

According to another embodiment of the tire ballast composition, the non-wood source of hemicellulose and lignin is selected from the group consisting of wheat straw, rice straw, barley straw, oat straw, rye grass, coastal Bermuda grass, *Arundo donax, miscanthus*, bamboo, sorghum, banana harvest residue, pineapple residue, sugarcane bagasse, industrial hemp, recreational *cannabis* residue, nut shell residue, kenaf, switchgrass, succulents, alfalfa, corn stover, and, flax straw and wherein the lignin and hemicellulose comprise less than 0.5% (or optionally, 0.2%, or 0.1% or 500 ppm) of sulfur.

According to another embodiment of the tire ballast composition, the lignin includes less than 0.01 weight % sulfonic groups or no sulfonic groups.

According to another embodiment of the tire ballast composition, the amount of glycerin is from about 0.1 wt. % to about 1.0 wt. % and the amount of polyethylene glycol is from greater than 0 to about 25 wt. %.

According to another embodiment of the tire ballast composition, the amount of glycerin is about 0.5 wt. %.

It is noted that the methods of making and using the tire ballast composition may further include providing and/or mixing a blend of any solids and solvent as disclosed herein.

Also provided is a tire ballast kit. The tire ballast kit includes: a valve core removal tool; a pump and associated pump hoses; and a container of liquid tire ballast composition in fluid engagement with the pump. The liquid tire ballast composition includes: a solvent borne blend of solids, the solids comprising: (i) lignin in an amount of 5 weight % (or optionally, 10 or 15 or 20 weight %) to 30 or 40 or 50 weight % solids, and (ii) a sugar compound in an amount of 0.1 weight % (or optionally 0.2 or 0.5 or 1.0 or 2.0 or 5.0 weight %) to 20 weight % (or optionally, 10 or 15 or 18 or 25 or 30 weight %) solids, wherein at least 90 weight % (or optionally, 95 or 97 or 98 or 99 weight %) of the sugar compound is derived from hemicellulose, and, (iii) a solvent, wherein the solvent comprises water, wherein the tire ballast composition comprise from about 45 to about 70 wt. % water, wherein the tire ballast composition has a pH in the range of 7.0 to 10, wherein the lignin and sugar compound comprise less than 0.5 weight % (or optionally, 0.2 weight %, or 0.1 weight % or 500 ppm) of sulfur wherein the tire ballast composition is substantially free of anthraquinone (anthracenedione).

According to further aspects of the present disclosure, the lignin includes less than 3500 Da average molecular weight (or optionally, 2500 or 1500 Da).

According to further aspects of the present disclosure, the solids are substantially free of monosaccharides in that the solids comprise monosaccharides in an amount of less than 0.1 weight % (or optionally, 0.2 or 0.5 or 1.0 or 2.0 weight %) solids.

According to further aspects of the present disclosure, substantially all of the hemicellulose is derived from a non-wood source.

According to further aspects of the present disclosure, substantially all of the lignin is derived from a non-wood source.

According to further aspects of the present disclosure, the non-wood source of lignin and hemicellulose is selected from the group consisting of wheat straw, rice straw, barley straw, oat straw, rye grass, coastal Bermuda grass, *Arundo donax, miscanthus*, bamboo, sorghum, banana harvest residue, pineapple residue, sugarcane bagasse, industrial hemp, recreational *cannabis* waste, nut shell residue, kenaf, switchgrass, succulents, alfalfa, corn stover, and, flax straw.

According to further aspects of the present disclosure, the lignin includes less than 0.01 weight % sulfonic groups.

According to further aspects of the present disclosure, wherein the tire ballast composition includes one or more of methanol, ethanol, ethylene glycol, propylene glycol, and glycerin.

According to further aspects of the present disclosure, the tire ballast composition includes ethylene glycol and glycerin.

According to further aspects of the present disclosure, the amount of glycerin is from about 0.1 wt. % to about 1.0 wt. % and the amount of polyethylene glycol is from greater than 0 to about 25 wt. %.

According to another embodiment of the tire ballast composition, the amount of glycerin is about 0.5 wt. %.

According to another embodiment of the tire ballast composition, the amount of glycerin is from about 5 wt. % to about 50 wt. % and the amount of polyethylene glycol is from greater than 0 to about 30 wt. %.

According to another embodiment of the tire ballast composition, the amount of glycerin is about 5 wt. %.

Still other aspects and features of the tire ballast composition, tire ballast kit and associated methods are described in further detail below.

DETAILED DESCRIPTION

The present disclosure provides a tire ballast composition which includes a solvent borne mixture of solids dispersed or suspended in a solvent, wherein the solids comprise a blend of lignin and hemicellulose and the solvent includes water and optionally, glycerin and/or polyethylene glycol. For purposes herein, the term "hemicellulose" refers to the polysaccharides and oligosaccharides from wood and non-wood sources. The tire ballast composition is an alternative solution to tire ballast compositions based on chloride brines (i.e., it contains absolutely no chloride) and provides the same non-toxic, non-corrosive and non-abrasive properties as molasses. It is also an improvement upon the use of beet juice in that it requires a much lower biological oxygen demand for decomposition thereby providing a lower risk for pollution of soil and waterways upon disposal. It provides a further advantage from the use of beet juice as a tire ballast in that the present tire ballast composition originates from the residual non-agricultural waste or byproducts left after harvest whereas beet ballasts originate from the portion of the crop used for food production.

Solids of Tire Ballast Composition

The tire ballast composition includes a lignin component. The lignin component of the solids of the tire ballast composition may be derived from any of a variety of wood and non-wood sources through a number of processes to separate lignin from cellulose pulp. The distinction between wood and non-wood sources of lignin is known in the art and is not further delineated herein. In a particularly useful embodiment, the lignin may be derived from a non-wood source. In another embodiment, greater than 80 or 85 or 90 or 95 or 99 weight % of the lignin may be derived from a non-wood source. In still a further embodiment, all or substantially all (i.e., greater than 99 weight %) of the lignin may be derived from a non-wood source. Particularly useful non-wood sources of lignin may include agricultural products and grasses and may include species such as wheat straw, rice straw, barley straw, oat straw, rye grass, coastal Bermuda grass, *Arundo donax, miscanthus*, bamboo, sorghum, banana harvest residue, pineapple residue, sugarcane bagasse, nut shell waste, industrial hemp, recreational *cannabis* waste, nut shell residue, kenaf, switchgrass, succulents, alfalfa, corn stover, and, flax straw. Lignin from wood sources may include lignin derived from hardwood and softwood species.

Figure 1:
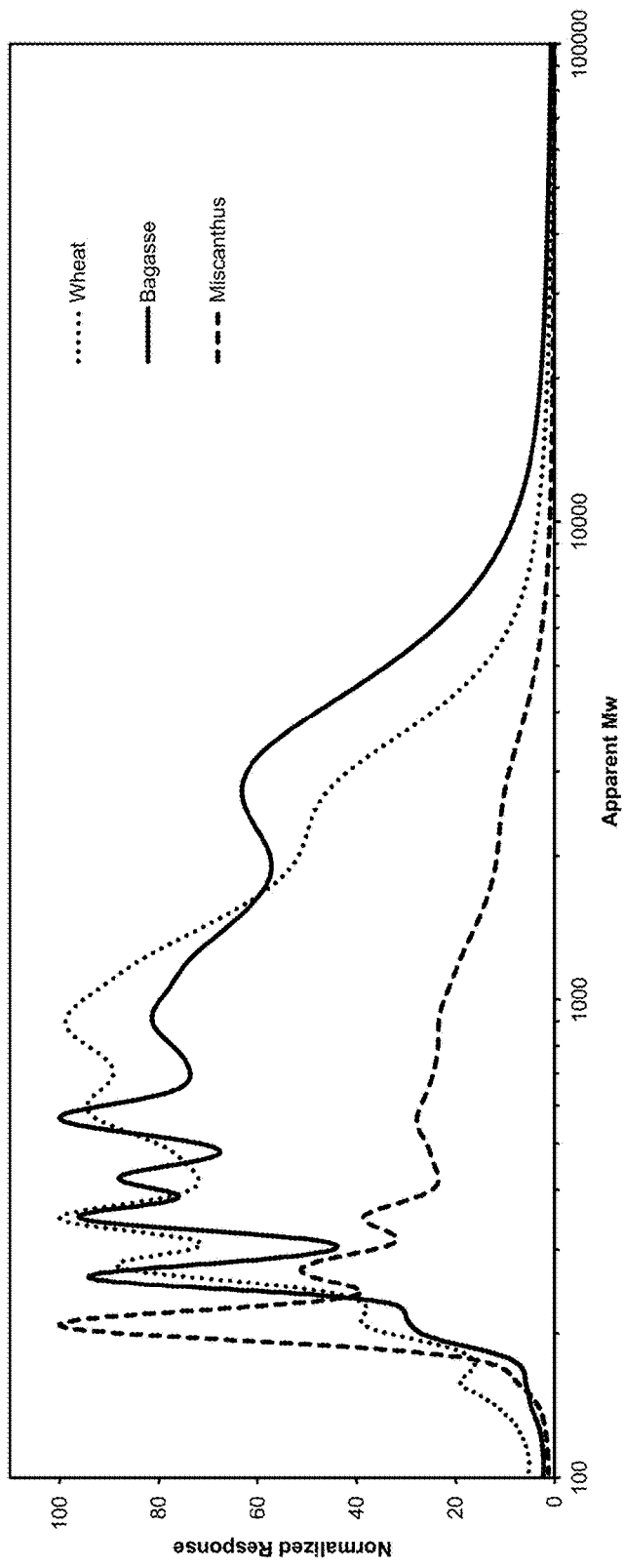
FIG. 1 is a graph which shows the number average molecular weight, weight average molecular weight, and polydispersity of wheat, bagasse and *miscanthus*.

Lignin molecular weight is known to vary in spent pulping liquors. As the lignin increases in molecular weight, it may precipitate out of solution or cause increases in viscosity which may cause challenges in spraying or injecting the tire ballast composition. Therefore, in certain embodiments, it is desirable to add polyelectrolytic functional groups such as sulfonic acids to counteract this effect. Without the addition of polyelectrolytic functional groups, such as sulfonic groups, the lignin becomes less soluble in water at increasing molecular weights. However, in certain embodiments, it is also desirable to keep the amount of sulfur within the composition relatively low so as to minimize or eliminate toxicity associated with sulfur-containing compounds. Accordingly, in some embodiments, the average molecular weight of the lignin provided in the present invention may not exceed 3500 Da (or 2500 or 1500 Da) and will include less than 0.01% by weight of sulfonic groups or no sulfonic groups. For example, the weight average molecular weight distribution of wheat straw, bagasse and *miscanthus* is provided within FIG. 1.

The solids of the present tire ballast composition will further include a sugar compound, which in one embodiment, may include hemicellulose, that is, polysaccharides and oligosaccharides derived from wood or non-wood sources. For purposes herein, the term hemicellulose does not include monosaccharides. The hemicellulose component of the solids may be derived from any of a variety of wood and non-wood sources through a number of processes used to separate hemicellulose from cellulose pulp. The distinction between wood and non-wood sources of hemicellulose is known in the art and is not further delineated herein. In a particularly useful embodiment, the hemicellulose may be derived from a non-wood source. In another embodiment, greater than 80 or 85 or 90 or 95 or 99 weight % of the hemicellulose may be derived from a non-wood source. In still a further embodiment, all or substantially all (i.e., greater than 99 weight %) of the hemicellulose may be derived from a non-wood source. Particularly useful non-wood sources of hemicellulose may include agricultural products and grasses and may include species such as wheat straw, rice straw, barley straw, oat straw, rye grass, coastal Bermuda grass, *Arundo donax, miscanthus*, bamboo, sorghum, banana harvest residue, pineapple residue, sugarcane bagasse, industrial hemp, recreational *cannabis* waste, nut shell residue, kenaf, switchgrass, succulents, alfalfa, corn stover, and, flax straw. Hemicellulose from wood sources may include hemicellulose derived from hardwood and softwood species.

In one embodiment, the sugar compound and lignin may be derived from the same source, which may be a non-wood source, a wood source or a blend thereof.

The lignin-hemicellulose complex of the tire ballast composition may include from about 30 wt. % to about 60 wt. % inorganic components derived from the pulping process. In certain embodiments, the lignin-hemicellulose complex of the tire ballast composition includes about 45 wt. % inorganic components. An example of an inorganic component derived from the pulping process and present within the lignin-hemicellulose complex is sodium although other inorganics may also be present. However, in certain embodiments, the tire ballast composition includes no inorganic compounds.

In one embodiment, the solids may include lignin in an amount of 5 weight % (or optionally, 10 or 15 or 20 weight %) to 30 (or optionally, 40 or 50 weight %) solids and the sugar compound in an amount of 0.1 weight % (or optionally, 0.2 or 0.5 or 1.0 or 2.0 or 5.0 weight %) to 20 weight % (or optionally, 10 or 15 or 18 or 25 or 30 weight %) solids.

In one embodiment, the sugar compound may include hemicellulose and is substantially free of monosaccharides in that it contains no monosaccharides to less than 0.1 weight % (or 0.2 or 0.5 or 1.0 or 2.0 weight %) of one or more monosaccharide sugar solids.

In other embodiments, the tire ballast composition may further include an organic compound. The organic compound may be selected from one of calcium magnesium acetate ($CaMg_2(CH_3COO)_6$), potassium acetate ($CH_3COOK$), potassium formate ($CHO_2K$), sodium formate (HCOONa), calcium formate ($Ca(HCOO)_2$), urea ($CO(NH_2)_2$, (a common fertilizer) also used as additives to sodium chloride) or mixtures thereof.

While the present disclosure contemplates that the components of the solids in the tire ballast composition disclosed herein may be derived from wood and non-wood sources, the present invention may be practiced using synthetic sources of lignin and hemicellulose.

Solvent for Tire Ballast Composition

The solvent of the tire ballast composition may, in many useful embodiments, include water. In addition to water, the solvent may include one or more of methanol ($CH_4O$), ethanol ($CH_3CH_2OH$, often abbreviated as $C_2H_5OH$ or $C_2H_6O$), ethylene glycol ($C_2H_6O_2$), propylene glycol ($C_3H_8O_2$), or glycerol ($C_3H_8O_3$) (or glycerine, glycerin). In certain embodiments, the solvent includes water, glycerin and polyethylene glycol. The amount of glycerin may range from about 5 wt. % to about 50 wt. %. The amount of polyethylene glycol may range from 0 or from greater than 0 to 30 wt. %. In certain embodiments, the amount of glycerin is about 5 wt. %. However, it is also contemplated that the tire ballast composition may not include glycerin and polyethylene glycol. It is further contemplated that the tire ballast composition would not include any alcohol whatsoever leaving and that the solvent may be solely water.

Industrial Application of Tire Ballast Compositions

The tire ballast compositions of the present disclosure may be applied to tires on any type of vehicle including but not limited agricultural and construction equipment as well as domestic cars, trucks and SUVs. Application may be achieved by spraying or injecting the tire ballast composition into the tire. The tire ballast composition is particular useful in tubeless tires as it improves weight distribution across the vehicle, traction and the transfer of power to the ground. The tire ballast composition of the present disclosure provides a non-corrosive solution and environmentally sound solution to existing tire ballast compositions.

In other embodiments, a method of making and applying a tire ballast composition is provided. These methods may respectively include the steps of providing and/or mixing a blend of solids and a solvent as described above and injecting or spraying the tire ballast composition within a tire.

In another embodiment, a method of using a composition as a tire ballast is provided. The method may include the steps of providing and/or mixing a blend of solids and a solvent as described above, providing a tire and applying the tire ballast composition to a tire. Application may include injecting or spraying the tire ballast composition into the tire. In certain embodiments, the method of using the composition as a tire ballast includes the following steps: i) raising or jacking up the vehicle; ii) rotating the valve stem on the tire to the 6 o'clock position; iii) lowering the tire to touch the ground; iv) removing pressure from the tire (in some cases, as low as 5 or about 5 to 15 or about 15 psi although other pressures are also contemplated) while keeping the bead intact; v) lifting the tire off the ground to allow for the tire to be rotated; vi) removing the core from the valve step (e.g., by using a core ejector tool); vii) attaching a pump to the valve stem and setting the pressure of the pump (e.g., 40 psi); viii) operating the pump and filling the tire with tire ballast composition to the level of the valve stem at the 6 o'clock position; ix) rotating the valve stem to the 3 o'clock or 9 o'clock position; operating the pump and filling the tire with the tire ballast composition to the level of the valve stem at the 3 o'clock or 9 o'clock position; x) rotating the valve stem to the 12 o'clock position; operating the pump and filling the tire with the tire ballast composition to the level of the valve stem at the 12 o'clock position; xi) reversing operation of the pump in the opposite direction to clear the tire ballast composition from the pump while releasing the pump from the valve stem; xii) reinserting the valve core; xiii) lowering the tire; and xiv) pumping air into the tire to top off the tire with air. During the filling process, operation of the pump may bogged down. In this case, it may be necessary to stop the pump and reverse operation of the pump in the opposite direction to evacuate air from the pump.

The method of injecting or spraying the tire ballast composition into the tire may be accomplished through use of various components of a kit. In certain embodiments, the kit includes a valve core removal tool; a pump, associated pump hoses, connectors and any other component parts necessary for operation; optionally, an air compressor and associated air tank if necessary, a container or tank of liquid tire ballast composition in fluid engagement with the pump, wherein the liquid tire ballast composition includes: a solvent borne blend of solids, the solids comprising: (i) lignin in an amount of 5 weight % (or optionally, 10 or 15 or 20 weight %) to 30 or 40 or 50 weight % solids, and (ii) a sugar compound in an amount of 0.1 weight % (or optionally 0.2 or 0.5 or 1.0 or 2.0 or 5.0 weight %) to 20 weight % (or optionally, 10 or 15 or 18 or 25 or 30 weight %) solids, wherein at least 90 weight % (or optionally, 95 or 97 or 98 or 99 weight %) of the sugar compound is derived from hemicellulose, and, (iii) a solvent, wherein the solvent comprises water, wherein the tire ballast composition comprise from about 45 to about 70 wt. % water, wherein the tire ballast composition has a pH in the range of 7.0 to 10, wherein the lignin and sugar compound comprise less than 0.5 weight % (or optionally, 0.2 weight %, or 0.1 weight % or 500 ppm) of sulfur wherein the tire ballast composition is substantially free of anthraquinone (anthracenedione).

Solvent borne tire ballast compositions according to the present disclosure may be applied by spraying or injecting the liquid tire ballast composition within the tire.

The tire ballast compositions of the present disclosure have a freeze point of at least −20° C., at least about −20° C., −21° C. or at least about −21° C. without any additives and with the addition of additives, the freeze point of the tire ballast composition of the present disclosure is even lower.

The present tire ballast composition has a specific gravity of 1.2 or about 1.2 w/v or higher and has a viscosity which allows for pumping the liquid into tires. In certain embodiments, it has been shown that the tire ballast composition of the present disclosure has a specific gravity of 1.25 and a solids content of 43% or about 43% which is ideal for pumping the liquid within tires.

Other Additives and Properties of the Tire Ballast Composition

Other additives which may be incorporated into the tire ballast composition include freeze point depressants, thickeners, dyes, stabilizers and the like.

The tire ballast composition may include sulfur in an amount not more than 0.5 weight % (or 0.2 weight %, or 0.1 weight % or 500 ppm). In some embodiments, the tire ballast composition may contain no sulfur or be substantially free of sulfur in that the tire ballast composition may contain no sulfur to less than 500 ppm sulfur. In some instances, the tire ballast composition may include sulfur, wherein the source of the sulfur is the same as the source of the lignin and a such may be relatively low. In this respect, sulfur derived from wood or non-wood pulp sources may be included in the tire ballast composition.

The tire ballast composition of the present disclosure is substantially free of anthraquninone (anthracenedione) in that it contains no anthraquninone to less than 0.1 weight % (or 0.2 or 0.5 or 1.0 or 2.0 weight %) anthraquninone. Anthraquinone is often utilized in the processing of wood and non-wood pulp sources.

The tire ballast composition of the present disclosure may be neutral to alkaline, that is, having a pH of about 7.0 and greater than 7.0. In some embodiments, the pH may be greater than 7.8 or 8.0 or 8.2 or 8.5. In some embodiments, the pH of the tire ballast composition and the may be between about 7 and about 10. In other embodiments, the pH of the tire ballast composition may be between 7 and about 9. In order to increase the pH of the tire ballast composition to the desired alkaline range, the tire ballast composition may include basic compounds in an amount suitable to adjust the pH of the tire ballast composition. A variety of basic compounds may be used. Exemplary basic compounds agents may include alkali metal carbonate and bicarbonate, such as sodium bicarbonate and calcium carbonate, hydroxide ion sources as alkali metal hydroxides, including, without limitation, sodium hydroxide, lithium hydroxide, and potassium hydroxide.

The tire ballast composition of the present disclosure may be prepared by mixing the solids and solvent in a suitable container and blending or agitating the mixture until the stable dispersion is achieved. As noted above, the pH of the tire ballast composition may be modified by addition of a suitable basic compound.

In another embodiment, the lignin and hemicellulose of the tire ballast composition may derive from the processing of wood or non-wood pulp source materials. While many processes for separating cellulose from lignin and hemicellulose are known, the present disclosure is directed to tire ballast compositions including the lignin and hemicellulose byproducts of such processes. It is known that some processes for separating cellulose from lignin and hemicellulose involve dissolving lignin and hemicellulose from wood or non-wood sources using a solvent of some sort; however, these byproducts will typically exceed one or more of the sulfur, anthraquinone, or pH limits taught herein. Moreover, pulping processes that involve use of high temperatures (greater than about 150° C.) typically yield byproducts that evidence high average molecular weight.

Ice Melting Tests

Ice melting tests were conducting according to the protocol set forth by the Strategic Highway Research Program in SHRP 205.2 which is based on the work of Akin and Shi set forth in Akin, M. And Shi, X., "Development of Standard laboratory testing Procedures to Evaluate the Performance of Deicers," *Journal of Testing and Evaluation*, Vol. 40, No. 6, 2012, pp. 1015-1026, both of which are hereby incorporated by reference in their entireties.

The ice melt tests were run at 28° F. (−2.22° C.) and at various time intervals to provide a range of results. The following solutions were tested:
1. 23.3 wt. % NaCl brine made with reagent grade NaCL and distilled water
2. NaCl-WSL solution made at a 40 NaCl:60 WSL (by volume) blend, wherein WSL refers to wheat straw liquor
3. $MgCl_2$-WSL solution made at a 30 $MgCl_2$:70 WSL (by volume) blend, wherein WSL refers to wheat straw liquor The three solutions noted above were made 24 hours in advance of testing and were allowed to equilibrate to test temperature prior to application. 3.8 mL of solution were applied to ice lenses at the SubZero Facility at Montana State University. After 10, 20, 30, 45 and 60 minute intervals, the volume of liquid ice melt was measured using syringes. The ice melting rates were then determined and are shown in the sections below.

TABLE I

Ice Melt Rate of NaCl-WSL and NaCl Control at 28° F. (−2.22° C.)

| Time | NaCl-VWS Ice Melt (mL/g) | | NaCl Control (mL/g) | |
|---|---|---|---|---|
| (min) | Avg | Stdev | Avg | Stdev |
| 0 | 0.00 | 0.00 | 0.00 | 0.00 |
| 10 | 0.50 | 0.01 | 0.65 | 0.26 |
| 20 | 0.74 | 0.10 | 0.99 | 0.27 |
| 30 | 0.87 | 0.14 | 1.17 | 0.28 |
| 45 | 0.91 | 0.07 | 1.19 | 0.31 |
| 60 | 1.10 | 0.14 | 1.25 | 0.28 |

TABLE II

Ice Melt Rate of $MgCl_2$-WSL at 28° F. (−2.22° C.)

| Time | $MgCl_2$-VWS Ice Melt (mL/g) | |
|---|---|---|
| (min) | Avg | Stdev |
| 0 | 0.00 | 0.00 |
| 10 | 0.10 | 0.09 |
| 20 | 0.18 | 0.03 |
| 30 | 0.26 | 0.03 |
| 45 | 0.28 | 0.03 |
| 60 | 0.41 | 0.12 |

At 28° F. both the blended NaCl and $MgCl_2$ products bubbled as they were removed from the ice samples using a syringe. To ensure this did not impact the ice melt reading, the syringe was gently tapped to break the bubbles and the volume of melt was taken from the bottom of any remaining small bubbles.

From Table I, it can be observed that the NaCl-WSL blend showed an ice melt rate that is comparable to that of the NaCl control. After one hour (60 minutes), the NaCl-WSL blend had an ice melting capacity of 1.1±0.14 mL/g, and the NaCl control had an ice melting capacity of 1.25±0.28 mL/g. Thus, the ice melt capacity of the NaCl-WSL blend was not significantly different than the NaCl control. Table II also shows that the $MgCl_2$-WSL blend also exhibited ice melting properties at 28° F. (−2.22° C.).

Biochemical Oxygen Demand

Biochemical oxygen demand (also referred to as biological oxygen demand) refers to the amount of dissolved oxygen required by aerobic microbiological organisms to break down organic material that is present within a liquid sample at a certain temperature over a certain period of time. Non-wood sources of lignin and hemicellulose such as wheat straw liquor are readily suitable for use within tire ballast compositions. This is due to their relatively low biochemical oxygen demand compared to other materials which allows for easier degradation. For example, the biochemical oxygen demand for wheat straw liquor ranges from about 10,700 mg/L to about 12,700 mg/L. Other comparable materials such molasses and sugar beet concentrate have much a higher biochemical oxygen demand. For example, the biochemical oxygen demand of molasses is approximately 900,000 mg/L. Sugar beet concentrate exhibits a biochemical oxygen demand at levels which are similar to that of molasses. Without being bound to any particular theory, the difference in biochemical oxygen demand for non-wood sources of lignin and hemicellulose such as wheat straw liquor compared to other corrosion inhibitors such as molasses and sugar beet concentrate are believed to be due to the elimination or substantial elimination of monosaccharaides from the non-wood source of lignin and hemicellulose.

Corrosion Tests

Figure 2:
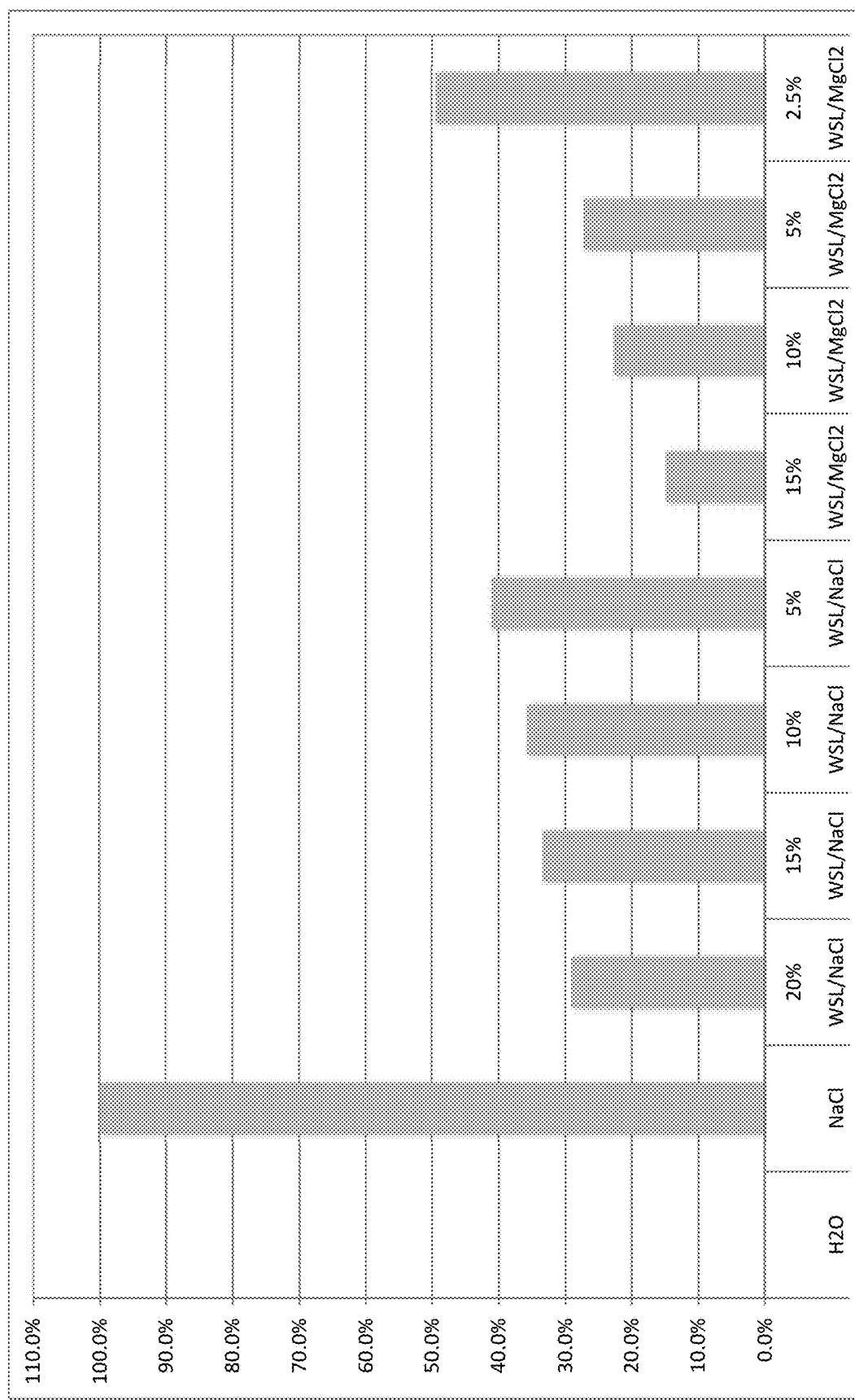
FIG. 2 is a graph which shows corrosion test results for various types tire ballast compositions.

Non-wood sources of lignin and hemicellulose may also act as a corrosion inhibitor. A corrosion inhibition test was conducted in accordance with the Pacific Northwest Snowfighters Snow and Ice Control Chemical Products Specifications and Test Protocols for the PNS Association of British Columbia, Colorodo, Idaho, Montana, Oregon and Washington (2010) which is hereby incorporated by reference in its entirety. In the test, metal coupons were dipped into several different types of brine solutions and solutions comprising a blend of brine with wheat straw liquor over a period of 72 hours. As shown within the graph of FIG. 2, the metal coupon dipped within NaCl solution exhibited 100% or complete corrosion according to the corrosion test scale. The percentage of 100% corrosion is the largest amount of corrosion possible by the deicer in the test. In this instance, the NaCl brine corroded 0.217 g on average off the weight of the coupon used in the dip test. The blends shown in the graph of FIG. 2 alongside the NaCl brine show comparatively in percentage how much less other deicer compositions corroded each coupon which was calculated based on how much less the coupon weighed and how much weight the coupon lost after 72 hours. Metal coupons dipped within blends of wheat straw liquor and brine exhibited much lower corrosion levels ranging from about 15% to less than 50%, with the majority of samples exhibiting a corrosion level between about 20% to about 40%. This same beneficial effect is also applicable to tire ballast composition for preserving tire from premature disintegration and decomposition.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. The term "invention" as it is used in this document is what is claimed in the claims of this document. The right to claim elements and/or sub-combinations that are disclosed herein as other inventions in other patent documents is hereby unconditionally reserved.

Having thus described the invention, it is now claimed:

We claim:
1. A tire ballast kit comprising:
   a valve core removal tool;
   a pump and associated pump hoses;
   a container of liquid tire ballast composition in fluid engagement with the pump,
   wherein the liquid tire ballast composition comprises:
      a solvent borne blend of solids, the solids comprising:
      (i) lignin in an amount of 5 weight % to 30-50 weight % solids,
      (ii) a sugar compound in an amount of 0.1 weight % to 20 weight % solids, wherein at least 90 weight % of the sugar compound is derived from hemicellulose, and
      (iii) a solvent, wherein the solvent comprises water, wherein the tire ballast composition comprise from about 45 to about 70 weight % water,
   wherein the tire ballast composition has a pH in the range of 7.0 to 10,
   wherein the lignin and sugar compound comprise less than 0.5 weight % of sulfur
   wherein the tire ballast composition is substantially free of anthraquinone (anthracenedione).

2. The tire ballast kit of claim 1, wherein the lignin comprises less than 3500 Da average molecular weight.

3. The tire ballast kit of claim 1, wherein the solids are substantially free of monosaccharides in that the solids comprise monosaccharides in an amount of less than 0.1 weight % solids.

4. The tire ballast kit of claim 1, wherein substantially all of the hemicellulose is derived from a non-wood source.

5. The tire ballast kit of claim 4, wherein substantially all of the lignin is derived from a non-wood source.

6. The tire ballast kit of claim 5, wherein the non-wood source of lignin and hemicellulose is selected from the group consisting of wheat straw, rice straw, barley straw, oat straw, rye grass, coastal Bermuda grass, *Arundo Donax, Miscanthus*, bamboo, sorghum, banana harvest residue, pineapple residue, sugarcane bagasse, industrial hemp, recreational *Cannabis* waste, nut shell residue, kenaf, switchgrass, succulents, alfalfa, corn stover, and, flax straw.

7. The tire ballast kit of claim 6, wherein the lignin includes less than 0.01 weight % sulfonic groups.

8. The tire ballast kit of claim 1, further comprising one or more of methanol, ethanol, ethylene glycol, propylene glycol, and glycerin.

9. The tire ballast kit of claim 8, wherein the tire ballast composition comprises ethylene glycol and glycerin.

10. The tire ballast kit of claim 9, wherein the amount of glycerin is from about 5 wt. % to about 50 wt. % and wherein the amount of polyethylene glycol is from greater than 0 to about 30 wt. %.

11. The tire ballast kit of claim 10, wherein the amount of glycerin is about 5 wt. %.

* * * * *